(12) United States Patent
Karanamsetty et al.

(10) Patent No.: US 10,754,762 B2
(45) Date of Patent: Aug. 25, 2020

(54) AUTOMATIC TRACKING OF FEATURE USAGE OF WEBPAGES ON A WEBSITE

(71) Applicant: Walmart Apollo, LLC, Bentonville, AR (US)

(72) Inventors: Haritha Karanamsetty, Sunnyvale, CA (US); Anil Kumar Pothala, Fremont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/262,712

(22) Filed: Jan. 30, 2019

(65) Prior Publication Data
US 2020/0242008 A1 Jul. 30, 2020

(51) Int. Cl.
G06F 9/44 (2018.01)
G06F 11/36 (2006.01)
G06F 16/23 (2019.01)
G06F 16/958 (2019.01)

(52) U.S. Cl.
CPC ...... *G06F 11/3664* (2013.01); *G06F 11/3688* (2013.01); *G06F 11/3692* (2013.01); *G06F 16/2379* (2019.01); *G06F 16/958* (2019.01)

(58) Field of Classification Search
CPC ............. G06F 11/3664; G06F 11/3688; G06F 11/3692; G06F 16/958; G06F 16/2379
USPC ........................................................ 717/125
See application file for complete search history.

(56) References Cited

U.S. PATENT DOCUMENTS

| | | | |
|---|---|---|---|
| 7,120,676 B2 | 10/2006 | Nelson et al. | |
| 7,506,047 B2 * | 3/2009 | Wiles, Jr. ............ | G06F 11/3414 709/224 |
| 7,523,191 B1 | 4/2009 | Thomas et al. | |
| 7,587,484 B1 * | 9/2009 | Smith ................... | H04L 67/22 709/223 |
| 7,739,282 B1 | 6/2010 | Smith et al. | |
| 7,792,948 B2 * | 9/2010 | Zhao ................... | H04L 41/046 709/224 |
| 9,026,080 B2 * | 5/2015 | Moran ................. | H04W 12/06 380/44 |
| 2001/0052089 A1 | 12/2001 | Gustaysson et al. | |
| 2002/0046363 A1 | 4/2002 | Nelson et al. | |
| 2008/0313633 A1 | 12/2008 | Zhu et al. | |

(Continued)

*Primary Examiner* — Anna C Deng
(74) *Attorney, Agent, or Firm* — Bryan Cave Leighton Paisner LLP

(57) ABSTRACT

A system can include one or more processors and non-transitory computer-readable media storing computing instructions configured to run on the one or more processors and perform a method for tracking one or more tracked features in one or more communication between a web browser and a web server. The method can detect that a session between the web browser and the web server has been initiated and monitor the communications to determine if any of the one or more tracked features are used. The method can further retrieve data from the communication when the communication is triggered by a tracked feature and save the data to a database. The data retrieved can include an identifier of the tracked feature and the session between the web browser and the web server. The method can save the data to the database in a different manner according to the types of the one or more tracked features. Other embodiments are disclosed.

20 Claims, 11 Drawing Sheets

(56) References Cited

U.S. PATENT DOCUMENTS

| | | | |
|---|---|---|---|
| 2009/0043883 A1* | 2/2009 | Aydt | G05B 23/0297 |
| | | | 709/224 |
| 2011/0307860 A1 | 12/2011 | Park et al. | |
| 2012/0131550 A1 | 5/2012 | Roytman | |
| 2012/0233629 A1 | 9/2012 | Swildens | |
| 2013/0055218 A1 | 2/2013 | Schwartz et al. | |
| 2015/0286487 A1* | 10/2015 | Glass | H04M 3/51 |
| | | | 715/707 |

* cited by examiner

From: testsystem@xyz.com
To: Admin1@xyz.com
Subject: : Analytics - Build # 8966 – Successfull
Test Results for Analytics Validation
URL=>http//reports.xyz.com/tests/8966/    910

| Test Name | Result | Assertions |
|---|---|---|
| Brand Facetclick Beacon validation | Pass | a=SEARCH_VIEW Beacon Found<br>a=ON_FACET_FILTER Beacon Found<br>nm={"_def":{"id":"brand","nm":""}} Beacon Found<br>li={"_def":{"id":"brand","nm":"LG", "la":""}}Beacon Found |
| Shipping & Pickup Facetclick Beacon validation | Pass | a=SEARCH_VIEW Beacon Found<br>a=ON_FACET_FILTER Beacon Found<br>li={"_def":{"id":"pickup_and_delivery","nm":"2-Day Shipping","la":"Select"}}Beacon Found |
| Pagination Beacon validation | Pass | a=ON_PAGINATION Beacon Found<br>rp=dis.pag.slc.clc Beacon Found<br>li={"_def":{"id":"","nm":2}}Beacon Found |
| STORE Select Beacon validation | Pass | a=ON_STORE_FILTER Beacon Found<br>rp=dis.ssh.slc.dbx Beacon Found |
| OnImageClick Beacon validation Suite | Pass | a=ON_IMAGE_SELECT Beacon Found |

| ← → C | ⓘ Not Secure | reports.xyz.com/tests/8966/ | | | | | | |
|---|---|---|---|---|---|---|---|---|

ENTERPRISE   search   LOG OUT

Analytics ▸ #8966 ▸ Test Results ▸ (root)                ENABLE AUTO REFRESH

← Back to Project
ⓘ Status
⟲ Changes
▤ Console Output
⟳ View Build Information
▦ History
◇ Git Build Data
▣ Test Result
◂ Previous Build
▸ Next Build

Test Result: (root)
0 failures (±0)   <u>920</u>

13 tests (+1)
Took 40 sec.

All Tests

| Class | Duration | Fail | (diff) | Skip | (diff) | Pass | (diff) | Total | (diff) |
|---|---|---|---|---|---|---|---|---|---|
| caspertest-facetclick | 12 sec | 0 | | 0 | | 4 | | 4 | |
| caspertest-onimgclick | 9.7 sec | 0 | | 0 | | 1 | +1 | 1 | +1 |
| caspertest-onstoreselect | 5.3 sec | 0 | | 0 | | 2 | | 2 | |
| caspertest-pagination | 5 sec | 0 | | 0 | | 3 | | 3 | |
| caspertest-shippingfacetclick | 7.5 sec | 0 | | 0 | | 3 | | 3 | |

FIG. 11

AUTOMATIC TRACKING OF FEATURE USAGE OF WEBPAGES ON A WEBSITE

TECHNICAL FIELD

This disclosure relates generally to automated monitoring of which features of the webpages on a website are used and how they are used.

BACKGROUND

Owners of websites generally would like to know if the features provided in the webpages on their websites are as useful for the intended users as planned. Online surveys may be used, but not many users voluntarily participate in online surveys. In addition, developers or designers of the websites would want to test the features on the webpages with automatic validation tools before any updated webpages or new features are released. Systems that can be used to monitor the actual usage of features of the webpages on a website and also test the features automatically are desired.

BRIEF DESCRIPTION OF THE DRAWINGS

To facilitate further description of the embodiments, the following drawings are provided in which:

FIG. 7 illustrates an exemplary user interface showing information in a saved request record, according to another embodiment;

FIG. 8 illustrates a different exemplary user interface hovering over a web browser and configured to show the one or more saved request records of a session between the web browser and the monitored website in real time, according to another embodiment;

FIG. 10 illustrates a test report showing results of multiple test cases, according to an embodiment; and FIG. 11 illustrates another test report showing the results of the multiple test cases, according to the embodiment in FIG. 10.

Figure 1:
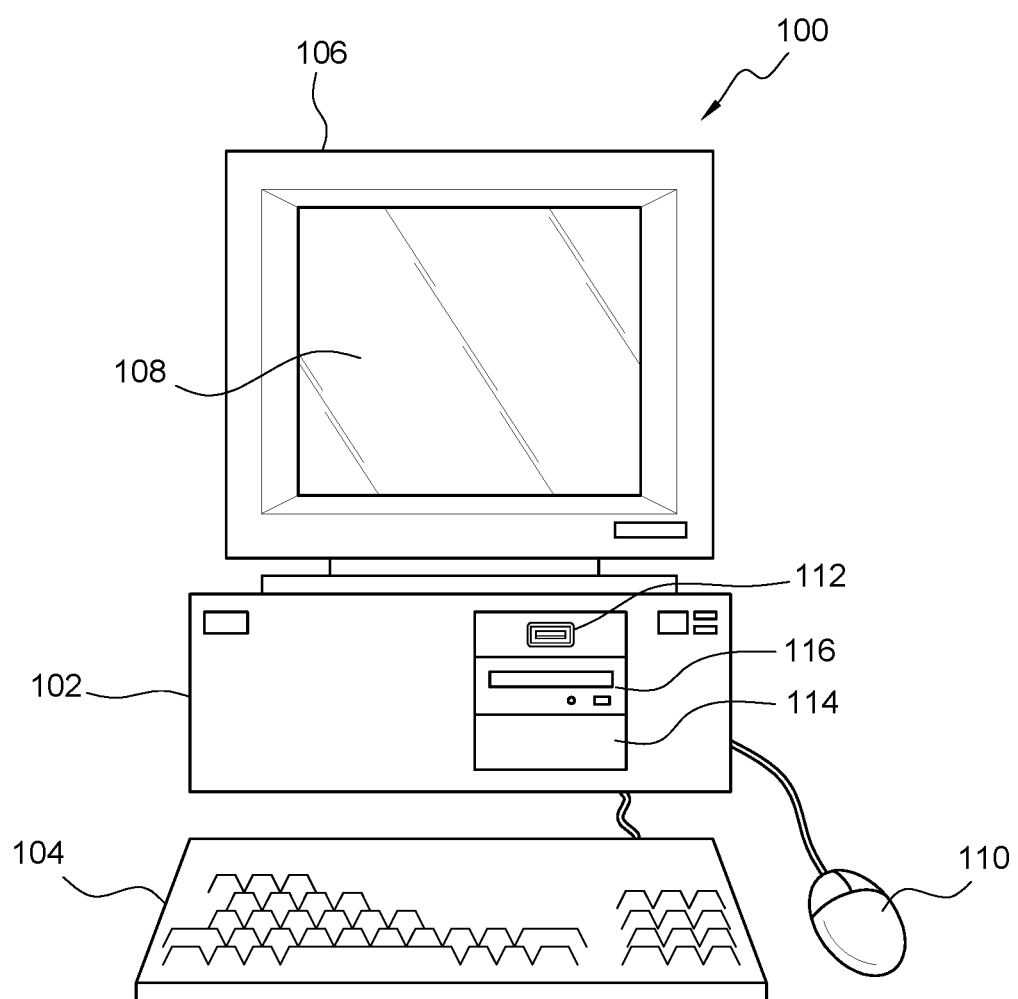
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time"

can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

In one embodiment, a system can include one or more processors; and one or more non-transitory computer-readable media storing computing instructions. The computing instructions can be configured to run on the one or more processors and perform detecting a session initiated between a web browser and a web server; monitoring a communication associated with the session between the web browser and the web server; retrieving data from the communication when the communication is triggered by a tracked feature; and saving the data to a database. The data from the communication can comprise an identifier of the tracked feature and the session. Also, when the tracked feature is a group feature and when a request record corresponding to the session and the tracked feature exists in the database before saving the data to the database, then saving the data to the database can comprise updating the request record by replacing previous data in the request record with the data. Furthermore, when the tracked feature is not a group feature or when a request record corresponding to the session and the tracked feature does not exist in the database before saving the data to the database, then saving the data to the database can comprise creating the request record in which to save the data in the database.

In another embodiment, a method can be implemented via execution of computing instructions configured to run at one or more processors and stored at one or more non-transitory computer-readable media. The method can comprise detecting a session initiated between a web browser and a web server; monitoring a communication associated with the session between the web browser and the web server; retrieving data from the communication when the communication is triggered by a tracked feature; and saving the data to a database. The data from the communication can comprise an identifier of the tracked feature and the session. Also, when the tracked feature is a group feature and when a request record corresponding to the session and the tracked feature exists in the database before saving the data to the database, then saving the data to the database can comprise updating the request record by replacing previous data in the request record with the data. Furthermore, when the tracked feature is not a group feature or when a request record corresponding to the session and the tracked feature does not exist in the database before saving the data to the database, then saving the data to the database can comprise creating the request record in which to save the data in the database.

Figure 2:
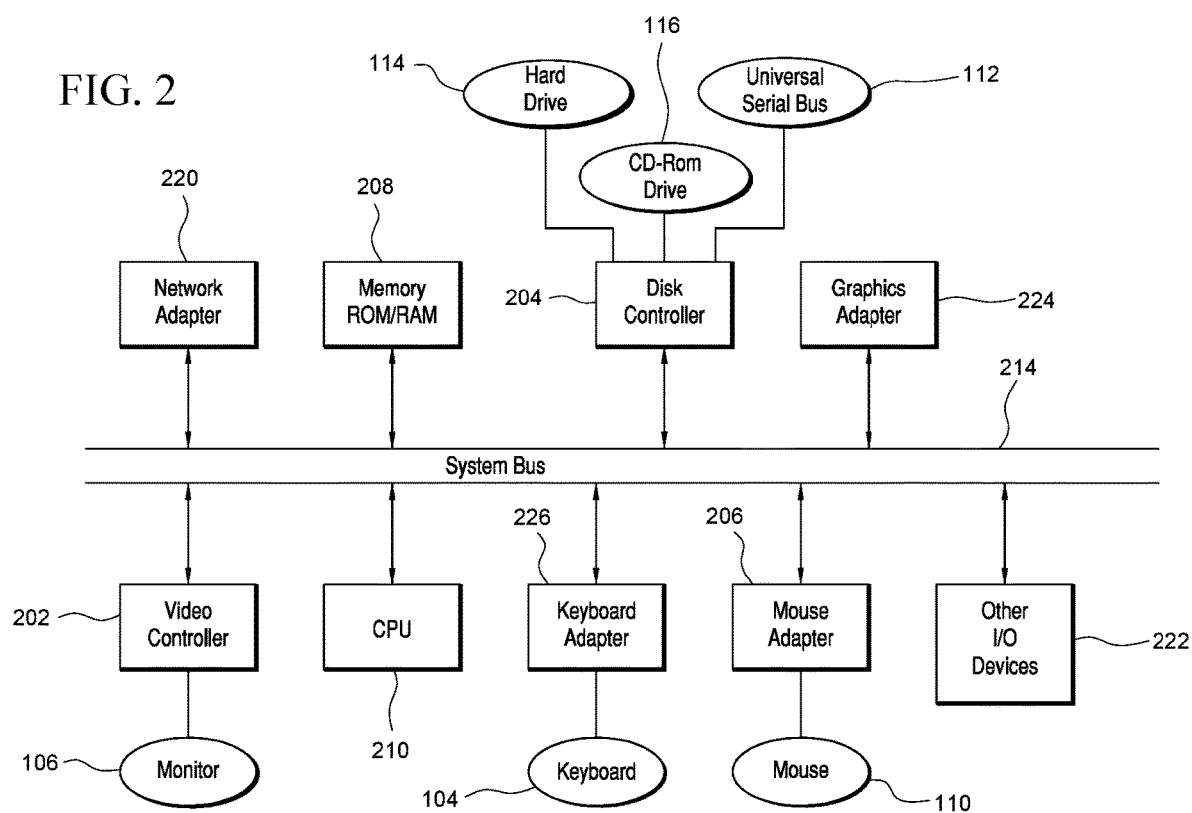
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components can reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smartphone. In certain additional embodiments, computer system 100 can comprise an embedded system.

Figure 3:
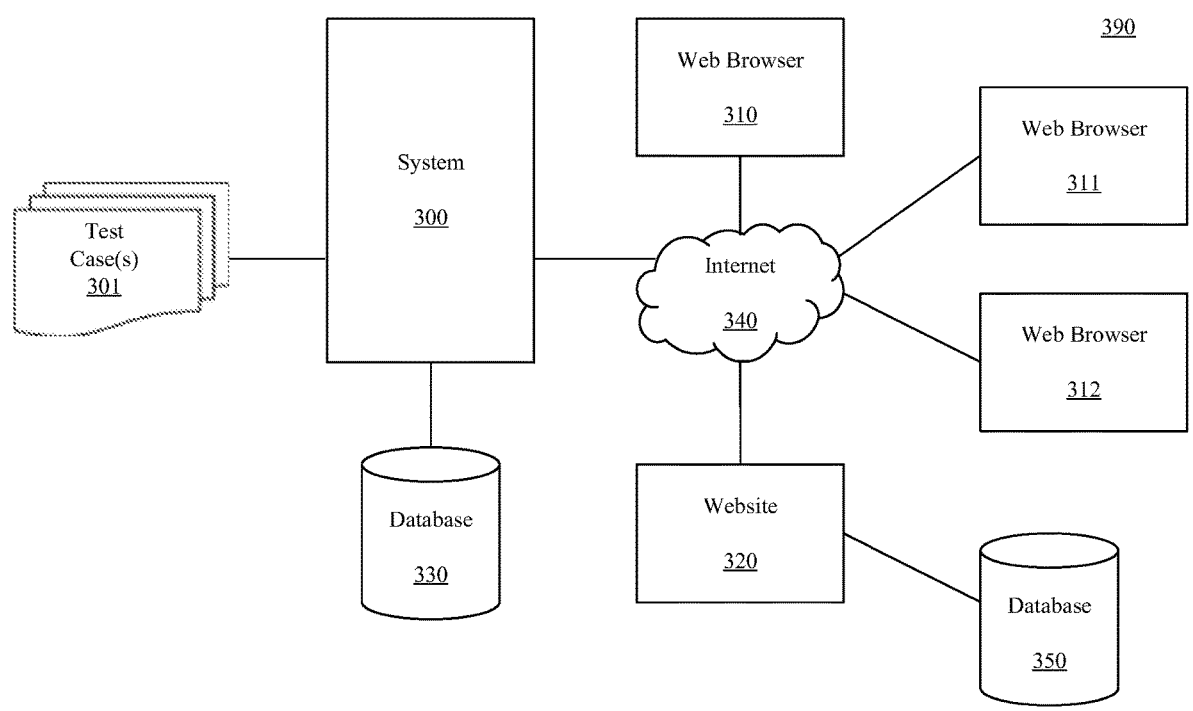
FIG. 3 illustrates a block diagram of a system that can be employed for automatic determination of the usage of the one or more tracked features of one or more webpages on a monitored website, according to an embodiment.

Turning ahead in the drawings, FIG. 3 illustrates a block diagram of a system 390, according to an embodiment. System 390 comprises a system 300. In many embodiments, systems 300 and/or 390 can be employed for automatic determination of the usage of the one or more tracked features of a monitored website 320. Systems 300 and 390 are merely exemplary, and embodiments of the systems are not limited to the embodiments presented herein. Systems 300 and/or 390 can be employed in many different embodiments or examples not specifically depicted or described herein. In some embodiments, certain elements, modules, or systems of systems 300 and/or 390 can perform various procedures, processes, and/or activities. In other embodiments, the procedures, processes, and/or activities can be performed by other suitable elements, modules, or systems of systems 300 and/or 390. Systems 300 and/or 390 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and/or 390 described herein.

As shown in FIG. 3, system 390 also comprises test case(s) 301 and database 330, both of which are coupled to system 300. System 390 further comprises web browsers 310, 311, and 312, and still further includes website 320, internet 340, and database 350. In this embodiment, internet 340 is coupled to system 300, website 320, and web browsers 310, 311, and 312, and database 350 is coupled to website 320. In other embodiments, system 390 can comprise system 300, without the other elements shown in FIG. 3, and in further embodiments, system 390 can comprise system 300, along with test case(s) 301, database 330, and/or database 350, without the other elements shown in FIG. 3. In still further embodiments, system 390 can comprise system 300, along with one or more of test case(s) 301, database 330, database 350, or website 320, without the other elements shown in FIG. 3 Further details regarding system 390 are explained below.

Figure 4:
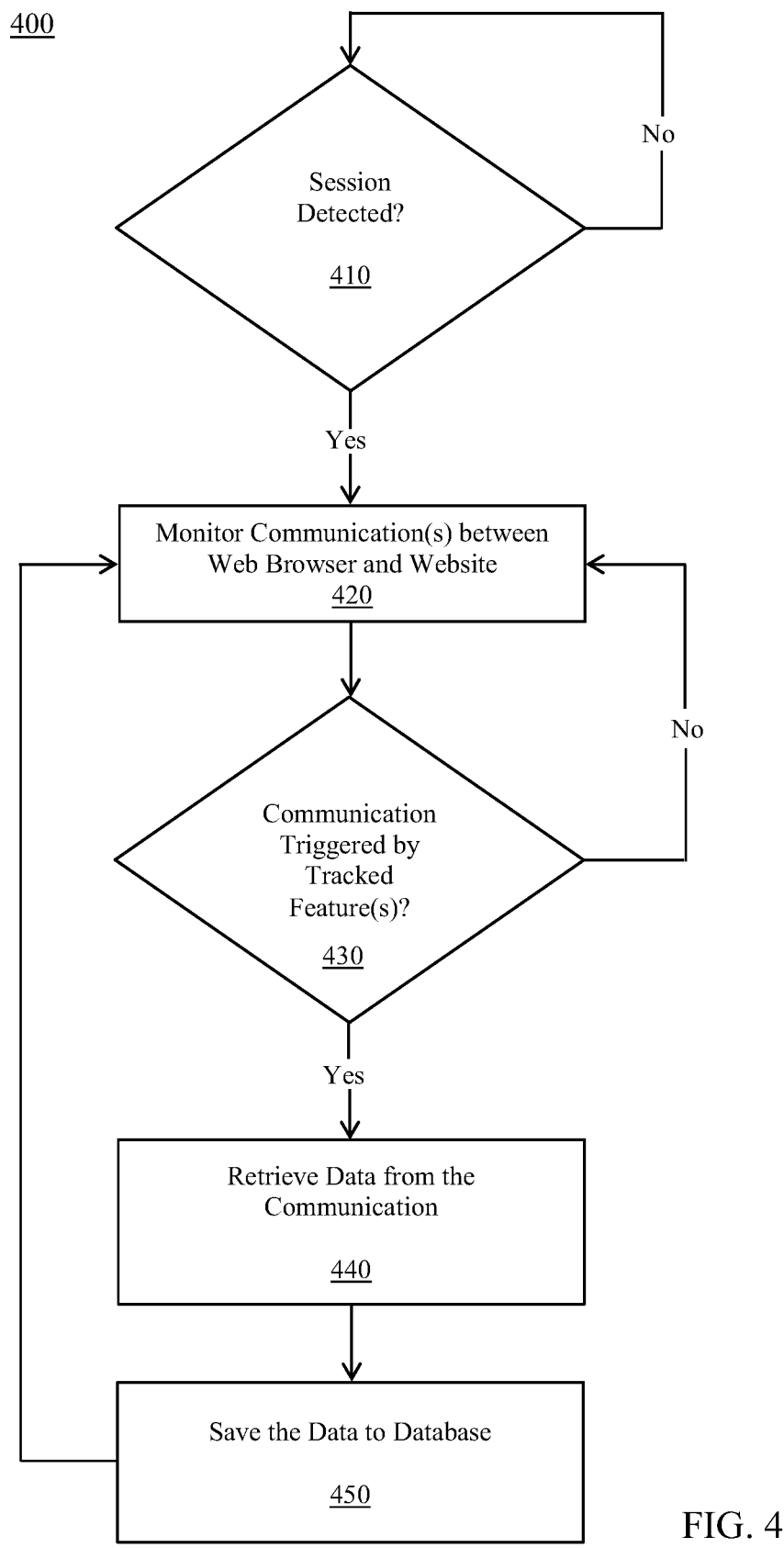
FIG. 4 illustrates a flow chart for a method for automatic determination of the usage of the one or more tracked features of one or more webpages on a monitored website, according to another embodiment.

Turning ahead in the drawings, FIG. 4 illustrates a flow chart for a method 400. In some embodiments, method 400 can be a method for automatic determination of the usage of the one or more tracked features of a monitored website. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system, such as system 300 (FIG. 3). The processor(s) can be similar or identical to the processor(s) described above with respect to computer system 100 (FIG. 1).

In embodiments where system 300 (FIG. 3) performs method 400, system 300 (FIG. 3) can be configured to: (1) detect a session initiated between web browser 310 (FIG. 3) and website 320 (FIG. 3), as in Block 410; (2) monitor a communication associated with the session between web browser 310 (FIG. 3) and website 320 (FIG. 3), as in Block 420; (3) retrieve data from the communication when the communication is triggered by a tracked feature, as in Blocks 430 and 440; and (4) save the data to a database, such as database 330 (FIG. 3), as in Block 450. In many embodiments, website 320 (FIG. 3) can be an online retail store featuring various products, a company portal, or any website that tracking of feature usage is desired. Examples of the communication between web browser 310 (FIG. 3) and website 320 (FIG. 3) can include a command and/or input data from web browser 310 (FIG. 3) to website 320 (FIG. 3) (including a user input or a test case, such as test case(s) 301), a webpage provided by website 320 (FIG. 3), and so forth. Test case 301 (FIG. 3) can be included in one or more simulated user actions from a user interface of system 300 (FIG. 3) that is configured to record the one or more stimulated user actions performed by a user, such as an administrator. In a different embodiment, the test case can be stored in a computer readable media of system 300 (FIG. 3) or a database, such as database 330 (FIG. 3).

In some embodiments where system 300 (FIG. 3) performs method 400, the data to be saved by system 300 (FIG. 3) to database 330 (FIG. 3), as in Block 450, can include an identifier of the tracked feature, the session, and other information that might be useful for the determination of the usage of the tracked features, such as the URL of the webpage with the tracked feature triggered, the input data submitted with the tracked feature, other features at the webpage but not used, or the time it takes a user to use the tracked feature after the webpage is loaded, etc.

Furthermore, in embodiments where system 300 (FIG. 3) performs method 400, the way system 300 (FIG. 3) saves the data to database 330 (FIG. 3) in Block 450 can differ based on the type of the tracked feature that is triggered. In many embodiments where system 300 (FIG. 3) performs method 400, when the tracked feature is a "group feature," and when a request record corresponding to the session and the tracked feature exists in database 330 (FIG. 3) before system 300 (FIG. 3) saves the data to the database 330, then the saving the data to the database 330 (FIG. 3) in Block 450 can comprise updating the request record by replacing previous data in the request record with the data. Additionally, in such embodiments, when the tracked feature is not a group feature, or when a request record corresponding to the session and the tracked feature does not exists in the database 330 (FIG. 3) before system 300 (FIG. 3) saves the data to the database, then the saving the data to the database 330 (FIG. 3) in Block 450 can comprise creating the request record in which to save the data in the database 330 (FIG. 3).

For example, in embodiments where system 300 (FIG. 3) performs method 400, when website 320 (FIG. 3) is an online retail store website, some tracked features allowing navigation of product categories, or pagination after a product search, can be categorized as group features, and only one entry of each of the group features (e.g., the data for the most recent occurrence within the particularly group feature) is saved in database 330 (FIG. 3) during the session. In the other embodiments of this example, other tracked features, such as searching for products, adding a product to the shopping cart, choosing 2-day-delivery, or reordering a previously purchased product, can be non-group features, and every time these non-group features are used or triggered, a separate entry is kept in database 330 for each occurrence of such feature. Categorizing tracked features into group features or non-group features and saving request records with the respective data, according to these embodiments, can reduce the number of logs to be saved in database 330 (FIG. 3) and improve performance of system 300 (FIG. 3).

Figure 5:
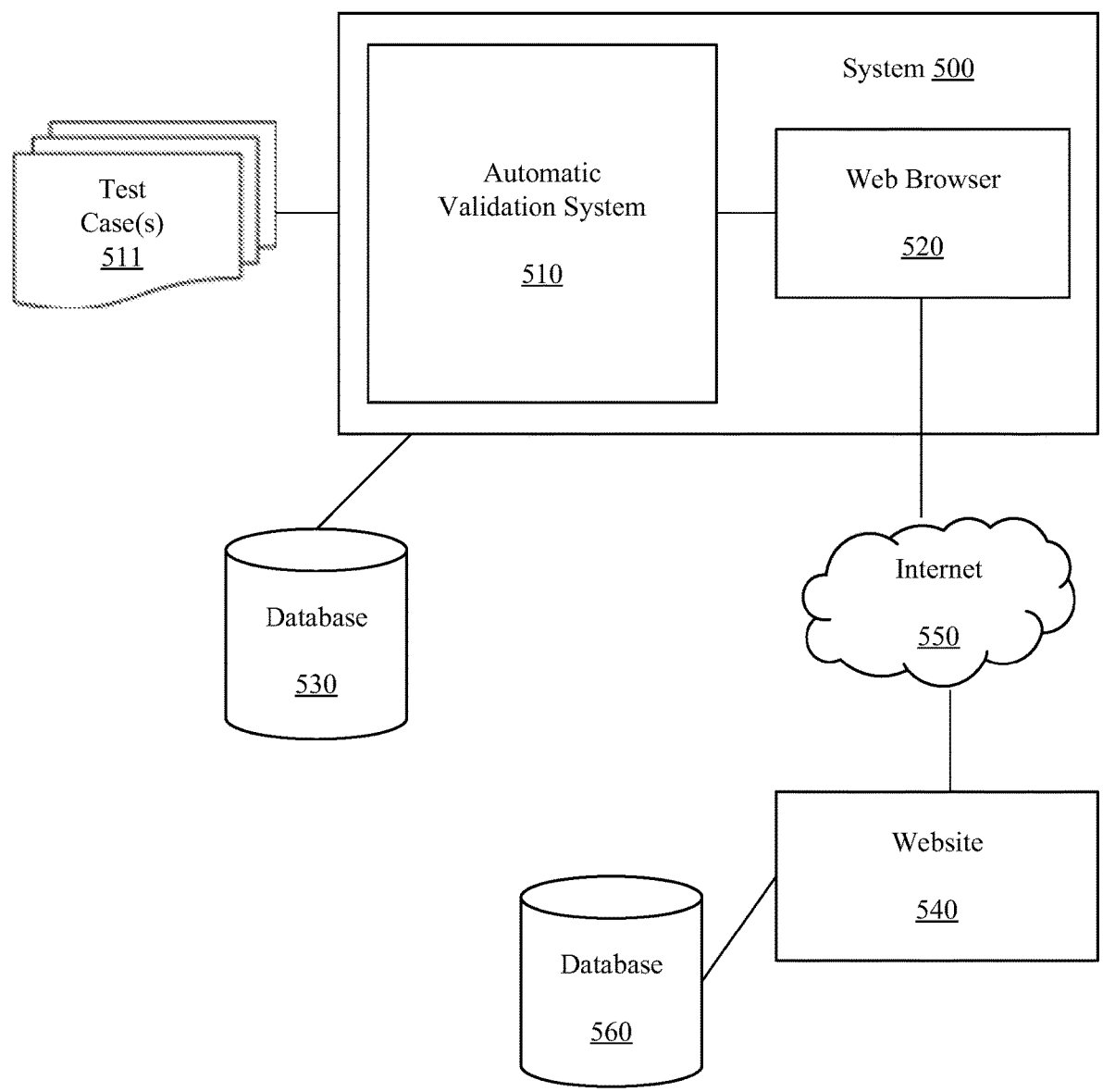
FIG. 5 illustrates a block diagram of a system that can be employed for automatic determination of the usage of the one or more tracked features of one or more webpages on a monitored website, according to another embodiment.

Turning ahead in the drawings, FIG. 5 illustrates a block diagram of a system 590, according to another embodiment. In many embodiments, system 300 (FIG. 3) can be employed for automatic simulating and testing of the one or more tracked features of a monitored website 540. In many embodiments, system 590 comprises system 500, which can comprise an automatic validation system 510 and a web browser 520. Systems 590 and 500 are merely exemplary, and embodiments of the systems are not limited to the embodiments presented herein. Systems 590 and/or 500 can be employed in many different embodiments or examples not specifically depicted or described herein. In some embodiments, certain elements, modules, or systems of systems 590 and/or 500 can perform various procedures, processes, and/or activities. In other embodiments, the procedures, processes, and/or activities can be performed by other suitable elements, modules, or systems of systems 590 and/or 500. Systems 590 and 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein. In many embodiments, systems 590 and 500, like systems 390 and 300 (FIG. 3) as provided above, can be suitable to perform method 400 (FIG. 4) and/or one or more of the activities of method 400 (FIG. 4).

As shown in FIG. 5, system 590 also comprises test case(s) 511 and database 530, both of which are coupled to system 500. System 590 further comprises website 540, internet 550, and database 560. In this embodiment, internet 550 is coupled to system 500 and website 540, and database 560 is coupled to website 540. In other embodiments, system 590 can comprise system 500, without the other elements shown in FIG. 5, and in further embodiments, system 590 can comprise system 500, along with test case(s) 511, database 530, and/or database 560, without the other elements shown in FIG. 5. In still further embodiments, system 590 can comprise system 500, along with one or more of test case(s) 511, database 530, database 560, or website 540, without the other elements shown in FIG. 5. Further details regarding system 590 are explained below.

Figure 6:
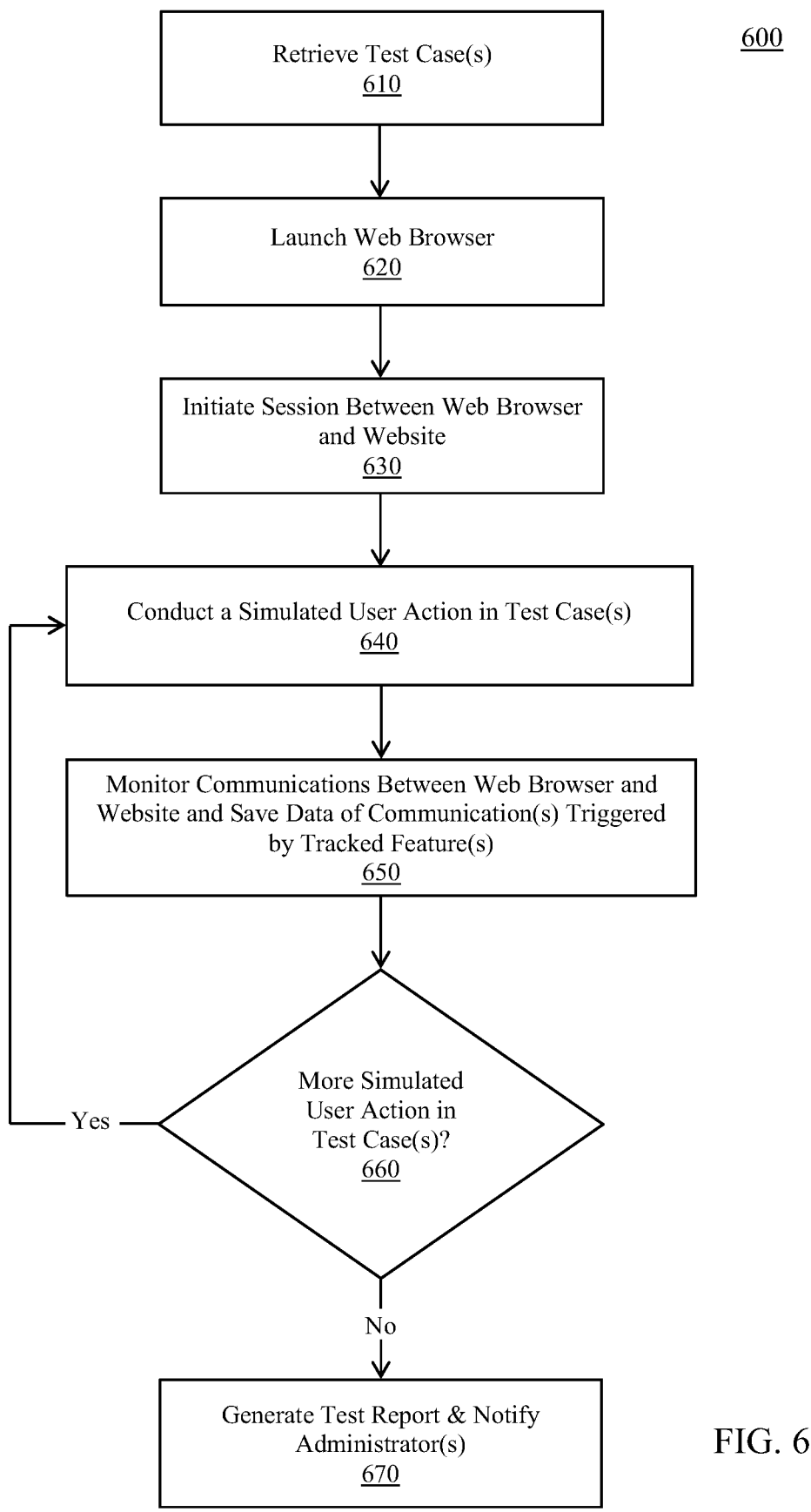
FIG. 6 illustrates a flow chart for a method for automatic determination of the usage of the one or more tracked features of one or more webpages on a monitored website, according to another embodiment.

Turning ahead in the drawings, FIG. 6 illustrates a flow chart for a method 600. In some embodiments, method 600 can be a method for automatic testing of the one or more tracked features of a monitored website. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 500 (FIG. 5) also can be suitable to perform method 600 and/or one or more of the activities of method 600. In embodiments where system 500 (FIG. 5) performs the activities in method 600, automatic validation system 510 (FIG. 5) can be configured to: (1) retrieve a test case, such as one of test case(s) 511 (FIG. 5), as in Block 610 (where the test case can comprise one or more stimulated user actions, at least one of which is associated with the tracked feature(s)); (2) launch web browser 520 (FIG. 5) that is configured to perform a test based on the test case, as in Block 620; and (3) perform the test based on the test case by: (a) initiating a session between web browser 520 and website 540 (FIG. 5), as in Block 630, (b) simulating one or more user actions on web browser 520 (FIG. 5) by conducting each of the one or more simulated user actions in the test case in sequence, as in Block 640, and (c) rendering a webpage from website 540 (FIG. 5), monitoring a communication associated with the session between web browser 520 (FIG. 5) and website 540 (FIG. 5), retrieving data from the communication when the communication is triggered by a tracked feature, and saving the data to database 530 (FIG. 5), as in Block 650.

In embodiments where system 500 (FIG. 5) performs method 600, at least one of the simulated user actions, or a sequence thereof, in the test case, such as one of test case(s) 511 (FIG. 5), can be associated with at least one of the tracked features and configured to cause the tracked feature(s) to trigger the communication(s). Test case(s) 511 (FIG. 5) in these embodiments can be provided by a user interface of system 500 (FIG. 5) configured to record one or more simulated user actions entered by a user, such as an administrator. In other embodiments, the test cases can be stored in a computer readable media of system 500 (FIG. 5) or a database, such as database 530 (FIG. 5). Examples of the simulated user actions in many embodiments can include computer instructions configured to enter a predetermined URL to web browser 520 (FIG. 5) with one or more predetermined parameters including an identifier of a tracked feature, provide a predetermined inquiry in a search box of a webpage on website 540 (FIG. 5) rendered on web browser 520 (FIG. 5), and/or move a mouse cursor and click a box on the webpage.

Continuing with method 600, in embodiments where system 500 (FIG. 5) performs the activities in method 600 and has initiated a communication between web browser 520 (FIG. 5) and website 540 (FIG. 5) and loaded the test case, if automatic validation system 510 (FIG. 5) determines that there are more simulated user action(s) remaining in the test case that are not yet conducted, as in Block 660, system 500 (FIG. 5) can be configured to repeat or perform the activities in Blocks 640 and 650 based on the remaining simulated user action(s); otherwise, system 500 (FIG. 5) of these embodiments can be configured to generate a test report and notify one or more administrators of system 500 (FIG. 5), as in Block 670.

Furthermore, in embodiments where system 500 (FIG. 5) performs method 600 and is configured to generate a test report, as in Block 670, system 500 (FIG. 5) can include all, or some, of the following information in the test report: the identifier of the test case; the tracked feature associated with at least one of the one or more simulated user actions in the test case; a test status of the tracked feature, such as pass/fail, counts of tracked features triggered, or time used to perform the test(s); and/or a hyperlink to a user interface displaying the request record associated with the test case and the tracked feature. In some embodiments, the user interface can be a web page or a graphical user interface of a software program such as an "app." In these embodiments, system 500 (FIG. 5), when performing Block 670, can be configured to notify the one or more predetermined administrators by emailing the test report to the one or more administrators or sending a push message with a hyperlink to the test report. In alternate embodiments where system 500 (FIG. 5) performs method 600, system 500 (FIG. 5) can skip all or some activities in Block 670 by not notifying the administrators of the test report generated or by generating a test report only when an administrator so requests.

As noted above, in many embodiments, system 500 (FIG. 5) can perform one or more, but not necessarily all, of the activities of method 600. For example, in some embodiments where system 500 (FIG. 5) performs only some activities in method 600, automatic validation system 510 (FIG. 5) can be configured to skip Block 620 and Block 630 and instead launch web browser 520 (FIG. 5) with a default URL configured to establish a session between web browser 520 (FIG. 5) and website 540 (FIG. 5). Alternatively, in some embodiments, system 500 (FIG. 5) can skip Block 630 altogether and instead include a simulated user action in one or more of test case(s) 511 (FIG. 5) that provide a URL to establish the session between web browser 520 (FIG. 5) and website 540 (FIG. 5).

In some embodiments, system 500 (FIG. 5) can perform one or more activities in addition to the activities in method 600 in FIG. 6. For instance, in such embodiments, before saving the data to database 530 (FIG. 5) in Block 650, system 500 (FIG. 5) can incorporate additional information to the data, such as an identifier of test case(s) 511, a second tracked feature rendered by web browser 520 (FIG. 5) but not triggering the communication, a snapshot of web browser 520 taken when the communication is triggered by the tracked feature, and so forth. In embodiments where system 500 (FIG. 5) performs method 600, web browser 520 (FIG. 5) can be configured to render a webpage from website 540 (FIG. 5), according to not only a simulated user action but also a real-time user action only when web browser 520 (FIG. 5) is not performing the test as in Blocks 640, 650, 660, and 670. Alternatively, web browser 520 (FIG. 5) in some embodiments can be configured to receive a user command to start, pause, stop, or resume the test. In other embodiments where system 500 (FIG. 5) performs method 600, system 500 (FIG. 5) can further comprise pausing for a predetermined time period between the simulated user actions when conducting one or more simulated user actions in test case 511 (FIG. 5). One reason or advantage of including a pause between simulated user actions is to better simulate human actions while allowing any delay in the loading and/or rendering of webpages from the monitored website. In these embodiments, system 500 can further provide a user interface configured to hover over web browser 520 and display the request record(s) corresponding to the session.

Figure 7:
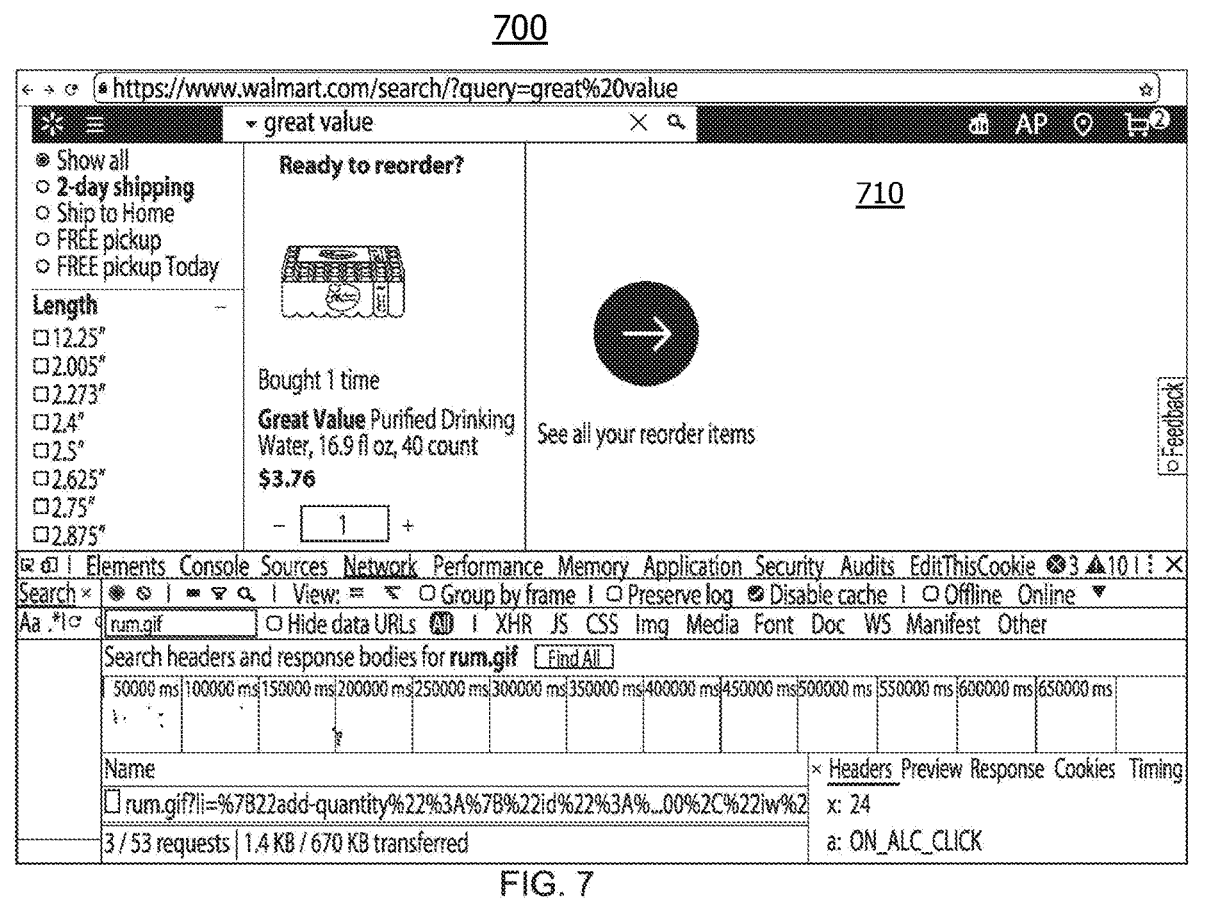

Turning ahead in the drawings, FIG. 7 illustrates an exemplary user interface 710 of system 700, according to another embodiment. In this embodiment, system 700 generates user interface 710 and shows information in a saved request record, including the identifier of a tracked feature that triggered a communication, such as adding another item to the shopping cart, and a snapshot of a web browser taken when the communication is triggered by the tracked feature.

Figure 8:
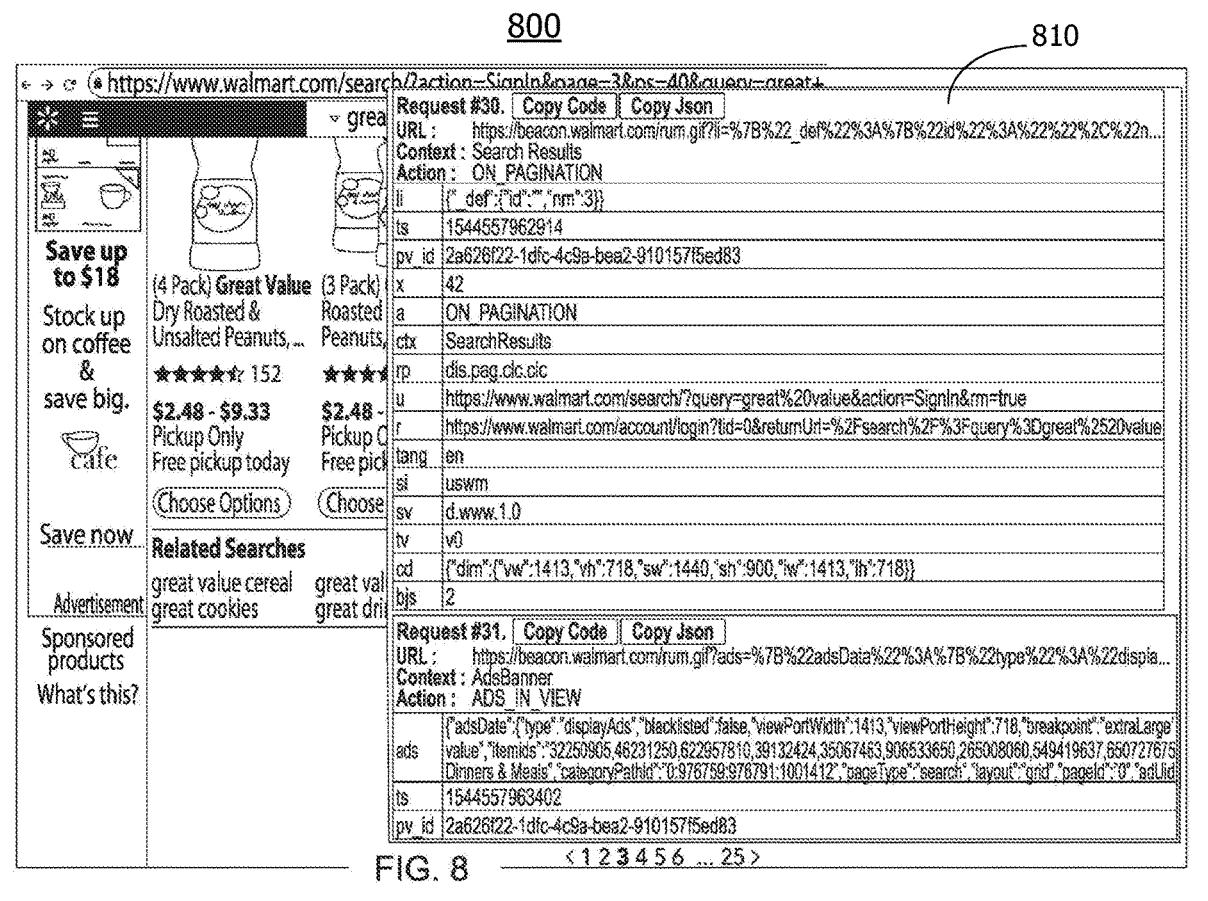
Figure 9:
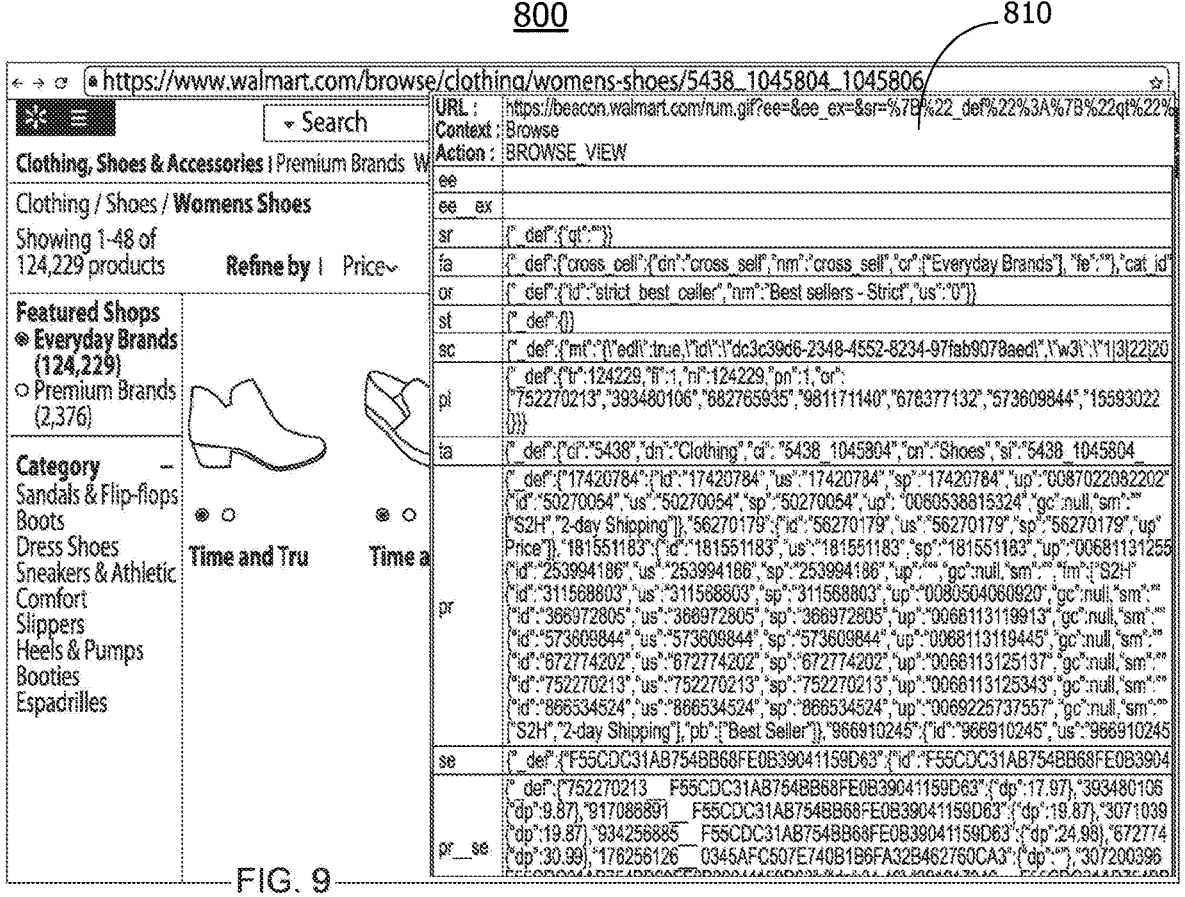
FIG. 9 illustrates the user interface of the embodiment in FIG. 8, showing updated request records of the session in real time.

Turning ahead in the drawings, FIGS. 8-9 illustrate another user interface 810 of system 800 in different states, according to another embodiment. In this embodiment, user interface 810 is configured to hover over a web browser and configured to show the one or more saved request records of an active session between the web browser and a monitored website in real time. With this user interface 810, in many embodiments, an administrator of system 800 can observe changes in the request records when system 800 is conducting one or more simulated user action in a test case. In some embodiments, the administrator of system 800 also can provide real-time user inputs to the web browser and observe changes in the request records.

Turning ahead in the drawings, FIGS. 10-11 illustrates test reports 910 and 920 generated by a system, according to another embodiment. In this embodiment, test reports 910 and 920 are configured to be displayed by user interfaces 1010 and 1020, respectively, and include results of multiple test cases conducted by system 900. In this embodiment, system 900 is configured to send test report 910 to at least one of the one or more predetermined administrators to review via user interface 1010. A URL to test report 920, a more thorough version of the test report 910, also is provided in this email.

Although automatic feature usage tracking and/or automatic testing tracked features in a website has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the procedures, processes, or activities of FIGS. 4 and 6 may include different procedures, processes, and/or activities and be performed by many different modules, in many different orders, and/or one or more of the procedures, processes, or activities of FIGS. 4 and 6 may include one or more of the procedures, processes, or activities of another different one of FIGS. 4 and 6. As another example, the systems or components within system 300, web browser 310, or website 320 in FIG. 3, or system 500, automatic validation system 510, web browser 520, or website 540 in FIG. 5 can be interchanged or otherwise modified.

In many embodiments, the system (390 in FIG. 3 and/or 590 in FIG. 5) can include the monitored website (320 in FIG. 3 or 540 in FIG. 5) and/or one or more browsers (310-312 in FIG. 3 or 520 in FIG. 5). The system (300 in FIG. 3 or 500 in FIG. 5), automatic validation system 510, the website (320 in FIG. 3 or 540 in FIG. 5) (or the system hosting the website), web browsers 310-312 or 520 (or the systems displaying the web browsers) can each be a computer system, such as computer system 100 (FIG. 1), as described above, and can each be a single computer, a single server, or a cluster or collection of computers or servers, or a cloud of computers or servers. In other embodiments, a single computer system can host the system (300/390 in FIG. 3 and/or 500/590 in FIG. 5), the website (320 in FIG. 3 or 540 in FIG. 5), and/or the web browsers 310-312.

In some embodiments, the system (300 in FIG. 3 and/or 500 in FIG. 5) and the website (320 in FIG. 3 or 540 in FIG. 5) can each be in data communication through Internet 340/550 with one or more user computers, such as the computers displaying browsers 310-312. In some embodiments, the web browsers 310-312 can be used by users, which also can be referred to as customers. In many embodiments, the website (320 in FIG. 3 or 540 in FIG. 5) can be hosted by a web server that hosts one or more other websites.

In some embodiments where the system (390 in FIG. 3 and/or 590 in FIG. 5) includes the website (320 in FIG. 3 or 540 in FIG. 5), an internal network that is not open to the public can be used for communications between the system (300 in FIG. 3 and/or 500 in FIG. 5) and the website (320 in FIG. 3 and/or 540 in FIG. 5). Accordingly, in some embodiments where system 390 includes website 320, website 320 (and/or the software and hardware used to display the website) can be referred to as a front end of system 390, as can be accessed and/or used by one or more users, using browsers 310-312, respectively. In these or other embodiments, an operator and/or administrator of the system (390 in FIG. 3 and/or 590 in FIG. 5) can manage the system (390 in FIG. 3 and/or 590 in FIG. 5), its processor(s), and/or its memory storage unit(s) using the input device(s) and/or display device(s) of the system (390 in FIG. 3 and/or 590 in FIG. 5).

In certain embodiments, as noted above, the web browsers (310-312 in FIG. 3 and/or 520 in FIG. 5), the website (320 in FIG. 3 and/or 540 in FIG. 5), and the various systems (300/390 in FIG. 3 and/or 500/590 in FIG. 5) can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, the system (300/390 in FIG. 3 and/or 500/590 in FIG. 5), web browsers (310-312 in FIG. 3 and/or 520 in FIG. 5) (or the systems displaying the web browsers), and the website (320 in FIG. 3 and/or 540 in FIG. 5) (or the system hosting the website) can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the system (300 in FIG. 3 and/or 500 in FIG. 5) and/or the website (320 in FIG. 3 and/or 540 in FIG. 5) in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of the system (300 in FIG. 3 and/or 500 in FIG. 5) or the website (320 in FIG. 3 and/or 540 in FIG. 5). In a similar manner, the processors and/or the non-transitory computer-readable media can be local and/or remote to each other.

Meanwhile, in many embodiments, the system (300/390 in FIG. 3 and/or 500/590 in FIG. 5) and the website (320 in FIG. 3 and/or 540 in FIG. 5) (or the system hosting the website) each also can be configured to communicate with and/or include one or more databases, such a database (330/350 in FIG. 3 and/or 530/560 in FIG. 5), and/or other suitable databases. The one or more databases can include a product database that contains information about logs, transactions, products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between the system (300/390 in FIG. 3 and/or 500/590 in FIG. 5), the website (320 in FIG. 3 and/or 540 in FIG. 5) (or the system hosting the website), and/or the one or more databases (330/350 in FIG. 3 and/or 530/560 in FIG. 5) can be implemented using any suitable manner of wired and/or wireless communication. Accordingly, the system (300/390 in FIG. 3 and/or 500/590 in FIG. 5) and the website (320 in FIG. 3 and/or 540 in FIG. 5) (or the system hosting the website), and the one or more databases (330/350 in FIG. 3 and/or 530/560 in FIG. 5) (or the one or more systems hosting the one or more databases) can each include software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A system comprising:
one or more processors; and
one or more non-transitory computer-readable media storing computing instructions configured to run on the one or more processors and perform:
detecting a session initiated between a web browser and a web server;
monitoring a communication associated with the session between the web browser and the web server;
retrieving data from the communication when the communication is triggered by a tracked feature; and
saving the data to a database, wherein:
the data from the communication comprises an identifier of the tracked feature and the session;
when the tracked feature is a group feature and when a request record corresponding to the session and the tracked feature exists in the database before saving the data to the database, then saving the data to the database comprises updating the request record by replacing previous data in the request record with the data; and
when the tracked feature is not the group feature or when the request record corresponding to the session and the tracked feature does not exist in the database before saving the data to the database, then saving the data to the database comprises creating the request record in which to save the data in the database.

2. The system of claim 1, wherein the computing instructions are further configured to run on the one or more processors and perform:
retrieving a test case comprising one or more simulated user actions, wherein at least one of the one or more simulated user actions is associated with the tracked feature; and
launching the web browser configured to perform a test based on the test case by:
conducting each one of the one or more simulated user actions in sequence, and rendering a webpage from the web server based on the conducting, wherein:
the data from the communication further comprises an identifier of the test case.

3. The system of claim 2, wherein the web browser is further configured to render the webpage from the web server according to a real-time user action only when the web browser is not performing the test.

4. The system of claim 2, wherein conducting the each one of the one or more simulated user actions further comprises pausing for a predetermined time period between the one or more simulated user actions.

5. The system of claim 2, wherein the web browser is further configured to receive a user command to start, pause, stop, or resume the test.

6. The system of claim 2, wherein the computing instructions are further configured to run on the one or more processors and perform:
generating a test report, wherein the test report comprises:
the identifier of the test case,
the tracked feature associated with at least one of the one or more simulated user actions in the test case,
a test status of the tracked feature, and
a hyperlink to a user interface displaying the request record associated with the test case and the tracked feature; and
notifying one or more predetermined administrators of the system of the test report.

7. The system in claim 6, wherein notifying the one or more predetermined administrators of the system of the test report comprises emailing the test report to the one or more predetermined administrators.

8. The system of claim 2, wherein the computing instructions are further configured to run on the one or more processors and perform:
  providing a user interface configured to record the one or more simulated user actions.

9. The system in claim 1, wherein the data from the communication further comprises at least one of: a second tracked feature rendered by the web browser but not triggering the communication, or a snapshot of the web browser taken when the communication is triggered by the tracked feature.

10. The system of claim 1, wherein the computing instructions are further configured to run on the one or more processors and perform:
  providing a user interface configured to hover over the web browser and display the request record corresponding to the session.

11. A method being implemented via execution of computing instructions configured to run at one or more processors and stored at one or more non-transitory computer-readable media, the method comprising:
  detecting a session initiated between a web browser and a web server;
  monitoring a communication associated with the session between the web browser and the web server;
  retrieving data from the communication when the communication is triggered by a tracked feature; and
  saving the data to a database, wherein:
    the data from the communication comprises an identifier of the tracked feature and the session;
    when the tracked feature is a group feature and when a request record corresponding to the session and the tracked feature exists in the database before saving the data to the database, then saving the data to the database comprises updating the request record by replacing previous data in the request record with the data; and
    when the tracked feature is not the group feature or when the request record corresponding to the session and the tracked feature does not exist in the database before saving the data to the database, then saving the data to the database comprises creating the request record in which to save the data in the database.

12. The method of claim 11 further comprising:
  retrieving a test case comprising one or more simulated user actions, at least one of the one or more simulated user actions being associated with the tracked feature; and
  launching the web browser configured to perform a test based on the test case by:
    conducting each one of the one or more simulated user actions in sequence, and rendering a webpage from the web server based on the conducting, wherein:
      the data of the communication further comprises an identifier of the test case.

13. The method of claim 12, wherein the web browser is further configured to render the webpage from the web server according to a real user action only when the web browser is not performing the test.

14. The method of claim 12, wherein conducting the each one of the one or more simulated user actions further comprising pausing for a predetermined period between the each one of the one or more simulated user actions.

15. The method of claim 12, wherein the web browser is further configured to receive a user command to start, pause, stop, or resume the test.

16. The method of claim 12 further comprising:
  generating a test report, the test report comprising:
    an identifier of the test case,
    the tracked feature associated with the at least one of the one or more simulated user actions in the test case,
    a test status of the tracked feature, and
    a hyperlink to a user interface displaying the request record associated with the tracked feature; and
  notifying one or more predetermined administrators of the test report.

17. The method of claim 16, wherein notifying the one or more predetermined administrators of the test report comprises emailing the test report to the one or more predetermined administrators.

18. The method of claim 12 further comprising:
  providing a user interface configured to record the one or more simulated user actions.

19. The method of claim 11, wherein the data of the communication further comprises at least one of: a second tracked feature rendered by the web browser but not triggering the communication, or a snapshot of the web browser taken when the communication is triggered by the tracked feature.

20. The method of claim 11 further comprising:
  providing a user interface configured to hover over the web browser and display the request record corresponding to the session.

* * * * *